May 3, 1960

G. A. KELLEY 2,935,154

LOW TEMPERATURE AIR CONDITIONING

Filed April 22, 1957

INVENTOR.
G. A. KELLEY
BY Charles S. Haughey
ATTORNEY

May 3, 1960  G. A. KELLEY  2,935,154

LOW TEMPERATURE AIR CONDITIONING

Filed April 22, 1957  2 Sheets-Sheet 2

INVENTOR.
G. A. KELLEY
BY Charles S. Haughey
ATTORNEY

United States Patent Office 2,935,154
Patented May 3, 1960

2,935,154
LOW TEMPERATURE AIR CONDITIONING

Gilbert A. Kelley, Toledo, Ohio, assignor, by mesne assignments, to Midland-Ross Corporation, Cleveland, Ohio, a corporation of Ohio Application April 22, 1957, Serial No. 654,116

4 Claims. (Cl. 183—2)

This invention relates to a method of and apparatus for controlling the moisture content of air by means of a hygroscopic solution. Continuous conditioning of air to very low dew point ranges and to very low temperatures presents some special problems and multiplies existing problems. When mechanical refrigeration is used in the stream of air to be controlled, there is a distinct problem of condensation upon the cooling surfaces, which becomes frost or ice when used in low temperature ranges below 32° F. The lower the temperature the lower the dew point, and the greater the moisture removal the more frost or ice is deposited upon the cooling surfaces and the less efficient they become, to the end that the cooling surfaces must be removed from service to remove the frost or ice so accumulated. When the required dew point of the treated air is much lower than 32° F., or such as requires cooling of the treated air to substantially below 32° F., this frosting problem becomes so great as to require substantial duplication of equipment for down time, and operating costs are also greatly increased. As the moisture removal load increases the heat removal load increases but the efficiency of the apparatus is reduced of frost on the cooling surfaces.

The application of hygroscopic salt solutions to the same service presents difficult problems. Thus it is difficult to operate such a system economically without saturating the salt solution and salting out at some point in the system, and the cooling costs have been excessive. The moisture absorbing capacity of an hygroscopic solution varies inversely with the temperature and directly with the concentration of the solution, and the dew point of the air being treated varies directly with the temperature of the solution. Thus the solution in contact with the air being treated must be very cold if very dry air is desired. In some applications the solution must be 0° F., or colder, the treated air being cooled to nearly 0° F. while the dew point of the air is maintained materially lower, and the salt concentration must then be maintained at perhaps 30% of the solution, where for normal room temperature applications the solution might be at 45% concentration and at 70° F. temperature.

The volume of solution that is circulated through a regenerator system must be returned to the contactor part of the apparatus and be cooled to the desired operating temperatures. An object of the present invention is to reduce the cost of maintaining the desired low temperatures in the contactor part of the apparatus.

A usual regenerator may concentrate a solution a maximum of about 5% from a 30% solution to a 35% solution, or from a 45% solution to about a 50% solution. The size, primarily height, of a regenerator required to obtain greater concentration from a given feedstock would be prohibitive. Another object of the present invention is to obtain the effect of greater concentrations, to make the degree of concentration by the regenerator of solution delivered to the contactor independent of the size of the regenerator, without expanding the size of the facilities required and obtaining the benefits of reduced heating and cooling loads in the system which result therefrom.

For a consideration of what I consider to be novel and my invention, attention is directed to the following specification and the claims appended thereto.

In the accompanying drawings forming part of this specification,

Figure 1:
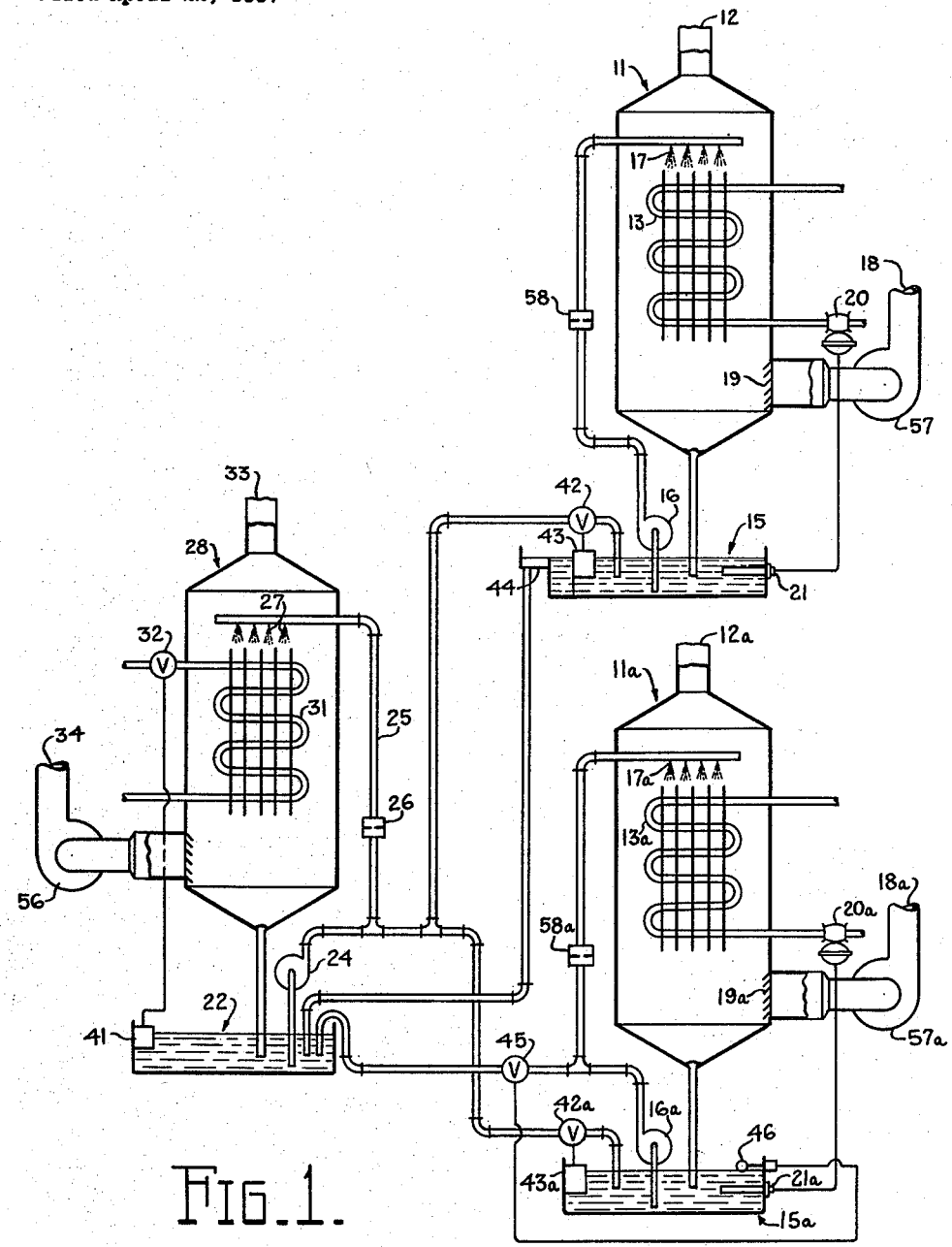
Figure 1 illustrates apparatus according to the present invention.

Figure 1 of the drawing illustrates an air conditioning system wherein a plurality of air contactors 11 and 11a may be serviced by a single regenerator 28 and obtain the benefits of a multiple sump operation in reduction of thermal losses and versatility of solution concentration control.

In the regenerator 28, pump 24 moves solution from the regenerator sump 22 through conduit 25 and orifice 26 to spray nozzles 27 and sprays it over heated contactor 31 and thence it returns to the regenerator sump 22. The regeneration is accomplished by heating the regenerator contactor 31 with steam entering at inlet valve 32 and circulating outside air through the regenerator to pick up and carry away the moisture vaporized in the regenerator. The outside air enters at inlet 33 and is exhausted at outlet 34 by fan 56. The flow of solution passing over contactor 31 is held to a minimum by orifice 26 to reduce pumping and heating costs, but is sufficient to completely wet the contactor 31 to avoid localized salting out of the solution, the flow of heating fluid, steam, through the contactor is controlled by a valve 32, preferably of the throttling type, responsive to the specific gravity of the solution in the sump as sensed by an instrument 41. The unit may be made to return solution from the contactor 31 to the instrument 41 for more rapid response, if desired.

In the contactors 11 and 11a, air to be dehumidified, or conditioned, is admitted to the gas and liquid contact chambers at air inlets 12 and 12a and passed over extended surface contactors 13 and 13a which are internally cooled as by a refrigerant flowing therethrough. Solution from the contact chambers' sumps 15 and 15a is circulated by pumps 16 and 16a to spray nozzles 17 and 17a. Contactors 13 and 13a will generally be expansion chambers for volatile refrigerants in a refrigeration cycle, although brine or other coolant solutions may be used. The dehumidified air passes out at the outlets 18 and 18a through spray eliminators 19 and 19a and is delivered by the fans 57 and 57a for use in the respective areas serviced. The temperature of the dehumidified air is substantially that of solution in the sump 15, as controlled by valve 20 responsive to thermostat 21.

The solution from sump 15 is circulated by pump 16 through orifice 58 over the contactor, where it absorbs moisture from the air, thus tending to dilute the solution. To regenerate, the regenerator sump 22 is utilized as a source of concentrated solution, and a controlled stream therefrom is admitted to sump 15 through a valve 42 responsive to the specific gravity of solution in the sump 15 as sensed by an instrument 43. Overflow of solution from sump 15 through weir 44 will be at such a rate as to return to the sump 22 of the regenerator a flow of hygroscopic material equal to that received through valve 42.

The second contactor 11a is substantially identical to contactor 11 except that in lieu of utilizing a weir to return solution from the sump 15a, a stream is delivered from the pump 16a through a valve 45, which is preferably of the throttling type, and the valve 45 is controlled responsive to a solution level responsive device 46 in sump 15a. Thus such hygroscopic material as is admitted to sump 15a by valve 42a responsive to a specific gravity sensing instrument 43a is returned to sump 22 through valve 45 responsive to level control 46. It will be noted that the weir solution return system for contactor 11 would be suitable where there is a pressure head available from the contactor sump to the regenerator sump, but the level control of contactor 11a is preferred otherwise. In either case the regenerator is operated responsive to a specific gravity control, and serves as a source of uniformly concentrated hygroscopic material for a plurality of contactor units to draw upon.

Figure 2:
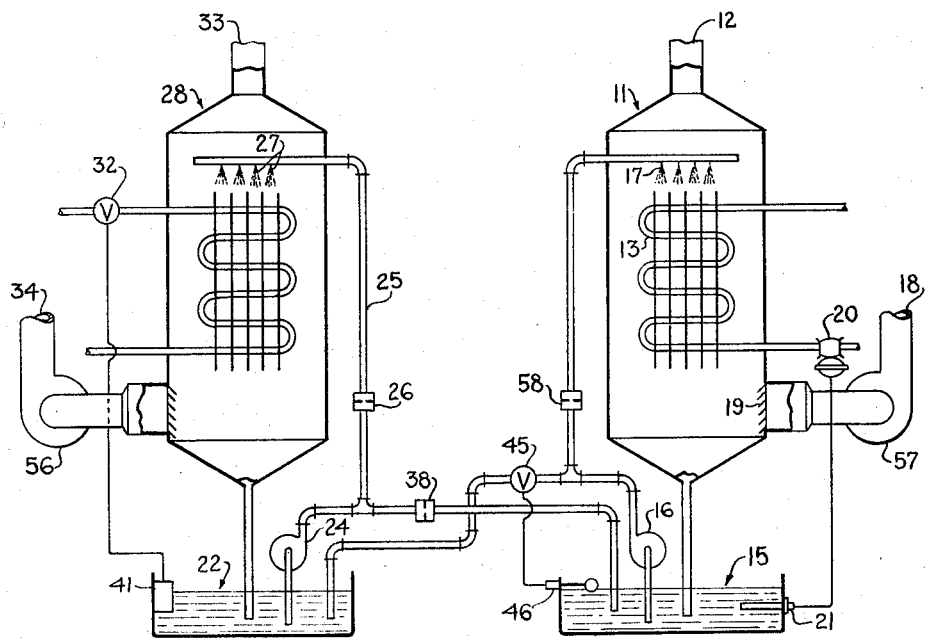
Figure 2 illustrates modified apparatus.

Figure 2 illustrates a modification wherein an orifice 38 in the outlet from pump 24 controls a constant flow of solution from sump 22 of the regenerator 28, at a concentration held substantially constant by the concentration control device 41 (which may be of any of several commercial types reading directly or as a function of boiling point, vapor pressure or the like) also used in Figure 1. The return of solution from sump 15 is controlled by a level device (which could be a float-type valve or a weir) which, as a float-type valve operates valve 45 in the outlet from pump 16.

In each of the illustrated Figures 1 and 2, the regenerator is operated to maintain a substantially constant concentration pool of solution in its sump which is drawn upon as needed, by one or more contactor units. The system shown in Fig. 2 is somewhat less sensitive, that is, it allows a wider variation of specific gravity in the contactor sump and hence allows a wider variation of dew point in the air contacted. It does, however, simplify the controls by elimination of a specific gravity type control on the contactor sump, and is useful in such installations as breweries where multiple contactors make the saving appreciable, and slight wet bulb, or dew-point variations are acceptable.

This application is a continuation-in-part of application Serial No. 566,610, now Patent No. 2,798,570, issued July 9, 1957, which was in turn a continuation of application Serial No. 76,079 now abandoned.

I claim:

1. In apparatus utilizing a water solution of hygroscopic material to control the humidity of a gas and comprising a first sump, a second sump, a gas and liquid contact chamber, means for circulating solution from the first sump through the gas and liquid contact chamber and back to the first sump to remove water from said gas, a regenerator having a heated surface, means for circulating a stream of solution from the second sump to the regenerator and back to the second sump to remove water from the solution, means for circulating a stream of solution from the second sump to the first sump and for returning a stream of solution from the first sump to the second sump, control means for controlling the heating effect of the heated surface to maintain the concentration of the solution in the second sump substantially constant; first flow control means responsive to a factor representative of the hygroscopic effect of the solution in the first sump for controlling the rate of flow of solution in one direction between said first and second sumps, and second flow control means responsive to the volume of solution in the first sump for controlling the rate of flow of solution in the other direction between said first and second sumps, and effective in cooperation with said first flow control means to maintain substantially constant both the volume and the hygroscopic effect of the solution in the first sump.

2. In a method for controlling the humidity of a gas by contacting such gas with cooled, hygroscopic solution to remove moisture therefrom, the steps of: maintaining a first body of hygroscopic solution; recirculating solution therefrom over a cooled surface in contact with the gas to be dehumidified in a first recirculation system; maintaining a second body of solution; recirculating solution from the second body thereof into contact with a heated surface and evaporating water therefrom and back to the second body in a second recirculation system; controlling the rate of evaporation of water from solution in the second recirculation system responsive to the concentration of the second body of solution in a manner to maintain such concentration constant; transferring solution from the second body of solution to the first body of solution at a rate controlled responsive to the hygroscopic effect of the first solution in a manner to maintain such hygroscopic effect constant; and returning a complementary stream of solution from the first body of solution to the second body of solution at a rate controlled to hold the volume in the first body of solution constant.

3. The method according to claim 2 wherein the rate of flow in the complementary stream is controlled responsive to the level of solution in the first body of solution.

4. Air conditioning apparatus comprising: a first contactor having a first body of solution and means for recirculating a stream therefrom in contact with a first stream of air to be conditioned; a second contactor having a second body of solution and means for recirculating a stream therefrom in contact with a second stream of air to be conditioned; a regenerator having a heated surface; a third body of solution, and means for circulating a stream of solution from the third body of solution to the regenerator and back to the third body of solution to evaporate water therefrom; control means responsive to concentration of the third body of solution for controlling the heating effect of the heated surface in a manner to maintain the concentration of the third body of solution constant; control means responsive to the hygroscopic effect of the first body of solution for delivering solution from the third body of solution to the first body of solution at a rate which maintains the hygroscopic effect of the first body of solution constant; means for returning solution from the first body of solution to the third body of solution at a rate controlled to maintain the volume of the first body of solution constant; control means responsive to the hygroscopic effect of the second body of solution for delivering solution from the third body of solution to the second body of solution at a rate which maintains the hygroscopic effect of the second body of solution constant; and means for returning solution from the second body of solution to the third body of solution at a rate controlled to maintain the volume of solution in the second body of solution constant.

References Cited in the file of this patent

UNITED STATES PATENTS

| | | |
|---|---|---|
| 2,090,466 | Bichowsky | Aug. 17, 1937 |
| 2,108,248 | Bichowsky | Feb. 15, 1938 |
| 2,147,248 | Fleisher | Feb. 14, 1939 |
| 2,192,126 | Downs | Feb. 27, 1940 |
| 2,235,004 | Ashley | Mar. 18, 1941 |
| 2,279,938 | Crawford | Apr. 14, 1942 |
| 2,420,993 | Kelley | May 20, 1947 |